United States Patent [19]

Hirota et al.

[11] Patent Number: 4,587,576
[45] Date of Patent: May 6, 1986

[54] VIDEO SIGNAL PROCESSING APPARATUS WITH PRE-EMPHASIS AND DE-EMPHASIS FOR USE IN A RECORDING AND REPRODUCING SYSTEM

[75] Inventors: Akira Hirota, Chigasaki; Yutaka Ichinoi, Yokohama, both of Japan

[73] Assignee: Victor Company of Japan, Ltd., Japan

[21] Appl. No.: 534,638

[22] Filed: Sep. 22, 1983

[30] Foreign Application Priority Data

Sep. 25, 1982 [JP] Japan .................................. 57-166800

[51] Int. Cl.⁴ .............................................. H04N 5/782
[52] U.S. Cl. .................................. 360/33.1; 358/160; 358/166; 358/335; 358/340
[58] Field of Search ................ 358/160, 166, 315, 335, 358/340, 33.1, 310, 314, 327, 328, 336; 360/33.1

[56] References Cited

U.S. PATENT DOCUMENTS 4,015,076 3/1977 Ishiodori .......................... 358/340 X Primary Examiner—Robert L. Richardson
Attorney, Agent, or Firm—Andrus, Sceales, Starke & Sawall

[57] ABSTRACT

Video signal processing apparatus for processing video signals in which pre-emphasis of high frequency components of signals to be recorded is effected, and de-emphasis of high frequency components of reproduced signals is carried out. The pre-emphasis circuitry and de-emphasis circuitry is of the so called forward and backward type for weighting video signals inputted at past and future time frames.

16 Claims, 15 Drawing Figures

14 FORWARD PRE-EMPH

23 BACKWARD DE-EMPH

24 FORWARD DE-EMPH

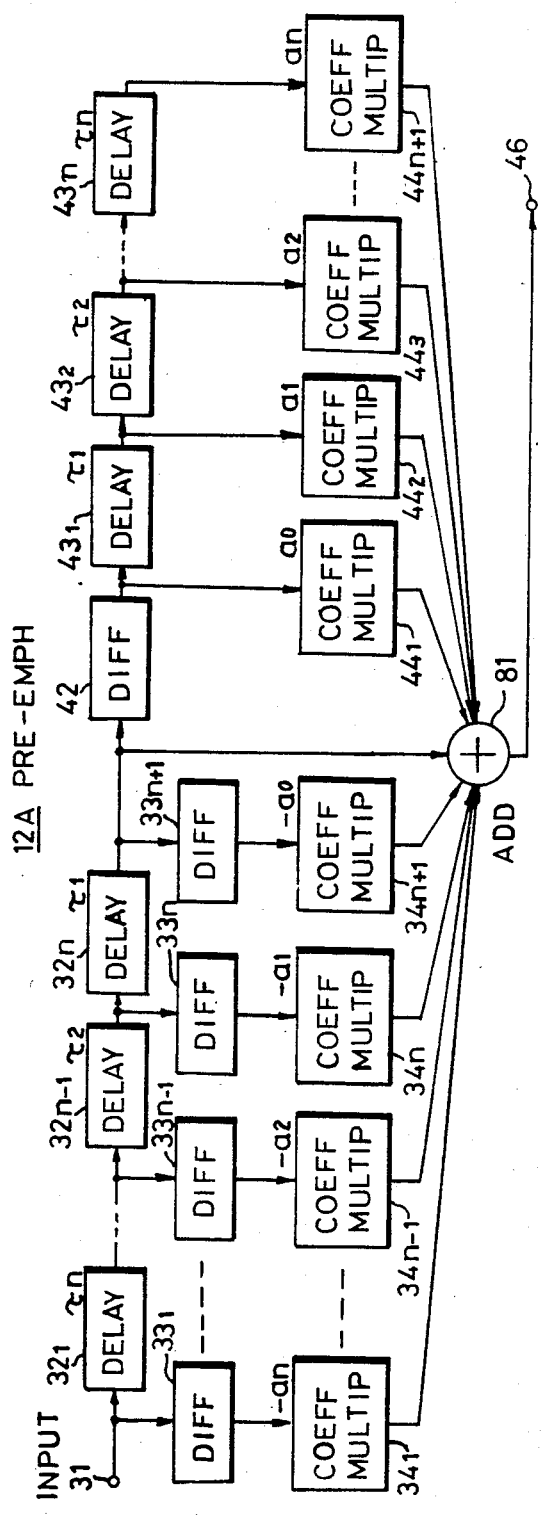
FIG.11 12A PRE-EMPH
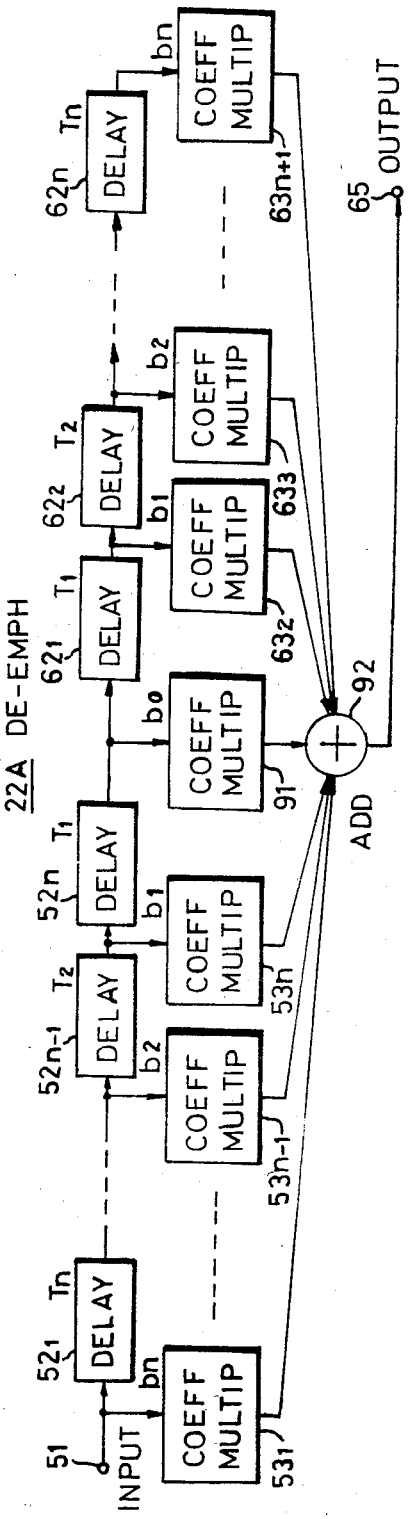
FIG.12 22A DE-EMPH

VIDEO SIGNAL PROCESSING APPARATUS WITH PRE-EMPHASIS AND DE-EMPHASIS FOR USE IN A RECORDING AND REPRODUCING SYSTEM

BACKGROUND OF THE INVENTION

The present invention generally relates to video signal processing systems, and more particularly to a video signal processing system for application in a signal processing system which carries out a pre-emphasis in a recording system which records a video signal onto a recording medium and carries out a de-emphasis in a reproducing system which reproduces the recorded signal from the recording medium. The signal processing system according to the present invention can suppress the overshoot level of an output signal of a pre-emphasis circuit to a relatively low level, and it is unnecessary to greatly clip the output signal level of the pre-emphasis circuit.

Generally in a video signal processing system which carries out a pre-emphasis with respect to the signal in the recording system and carries out a de-emphasis in the reproducing system, the input video signal which is to be recorded is first supplied to a pre-emphasis circuit in the recording system in order to emphasize the high frequency component of the input video signal. The output signal of the pre-emphasis circuit is supplied to a clipping circuit wherein the signal level is clipped so that the level at the tip end of the overshoot in the signal does not exceed a predetermined level. The output signal of the clipping circuit is supplied to a frequency modulating circuit wherein a carrier is frequency modulated by this signal. The output frequency modulated video signal of the frequency modulating circuit, is recorded onto a magnetic tape by a magnetic head. In the reproducing system, the signal which is reproduced from the magnetic tape by the magnetic head, is supplied to a frequency demodulating circuit wherein the reproduced signal is demodulated. The demodulated output of the frequency demodulating circuit is supplied to a de-emphasis circuit wherein the high frequency component which was emphasized in the pre-emphasis circuit in the recording system is de-emphasized or attenuated, to restore the video signal into its original form. The output signal of the de-emphasis circuit is obtained as the reproduced video signal.

As is well known, the signal-to-noise (S/N) ratio becomes deteriorated with respect to the higher frequency components of the frequency modulated video signal by recording and reproducing of the signal. Thus, the S/N ratio in the high frequencies can be improved, by emphasizing the level of the high frequency component in the pre-emphasis circuit as described above, and increasing the modulation factor with respect to the high frequencies.

The conventional pre-emphasis circuit was designed to attenuate the low frequency component with respect to the high frequency component of the input video signal, by use of a filter comprising a capacitor and resistors. On the other hand, the conventional de-emphasis circuit was designed to suppress the high frequency component of the input video signal more than the low frequency component, by use of a filter comprising a capacitor and resistors. These conventional pre-emphasis and de-emphasis circuits each using the filter comprising the capacitor and resistors, can be considered as a circuit which performs weighting with respect to an information which was obtained prior to a present information and adds this weighted information to the present information. In the present specification, a type of circuit which performs weighting with respect to the information which was obtained prior to the present information and adds this weighted information to the present information in this manner, will be referred to as a "forward type" circuit.

As a forward type filter other than the above filters comprising the capacitor and resistors, there was a forward type transversal filter comprising a plurality of delay circuits, a plurality of coefficient multipliers, and an adder.

However, according to the conventional pre-emphasis circuit employing any of the above filters, a large overshoot is introduced at the rising and falling portions of the pre-emphasized signal waveform if a square wave signal is subjected to the pre-emphasis. When a large overshoot which exceeds a certain level exists in the pre-emphasized signal, a so-called inversion phenomenon occurs if a frequency modulated video signal which is obtained by frequency modulating a carrier by this pre-emphasized signal is recorded onto and reproduced from the magnetic tape. The inversion phenomenon is the phenomenon in which the black and white at parts of the reproduced picture which correspond to the overshoots become inverted. Accordingly, in order to prevent this inversion phenomenon from occurring, a clipping circuit was provided between the pre-emphasis circuit and the frequency modulating circuit in the conventional circuit. This clipping circuit clipped the signal level so that the level at the tip end of the overshoot in the signal does not exceed a predetermined level.

However, if the clipping circuit greatly clips the overshoot of the pre-emphasized signal so as to prevent the inversion phenomenon from occurring, the picture quality of the reproduced picture deteriorates at parts which correspond to the overshoots which have been greatly clipped.

SUMMARY OF THE INVENTION

Accordingly, it is a general object of the present invention to provide a novel and useful video signal processing system in which the above described problems have been eliminated.

Another and more specific object of the present invention is to provide a video signal processing system in which the recording system comprises a series connection of a forward type pre-emphasis circuit which performs weighting with respect to a past input information which was obtained prior to a present information and adds this weighted information to the present output information, and a pre-emphasis circuit of a type (hereinafter referred to as a "backward type") which performs weighting with respect to a future input information which will be obtained subsequent to an output time when an output information is obtained and adds this weighted information to the output information, and the reproducing system comprises a series connection of a forward type de-emphasis circuit, and a backward type de-emphasis circuit which performs weighting with respect to a future input information which will be obtained subsequent to an output time when an output information is obtained and adds this weighted information to the output information. According to the system of the present invention, the pre-emphasis circuit and the de-emphasis circuit each comprise a series connection of forward type and backward type circuits. Thus, the overshoot level of the output video signal of the pre-emphasis circuit can be suppressed to a low level compared to the conventional circuit, without deteriorating the improving effect on the S/N ratio of the video signal in the high frequencies which is obtained by the pre-emphasis and the de-emphasis. For this reason, it is unlikely that the inversion phenomenon will occur. Furthermore, there is no deterioration in the picture quality caused by the clipping carried out in a clipping circuit which clips the level of the output video signal of the pre-emphasis circuit to a level under a predetermined level, because there is no need to greatly clip the level of the video signal.

Other objects and further features of the present invention will be apparent from the following detailed description when read in conjunction with the accompanying drawings.

BRIEF DESCRIPTION OF THE DRAWINGS

FIG. 11 is a systematic circuit diagram showing a pre-emphasis circuit in which backward type and forward type pre-emphasis circuits are combined;

FIG. 12 is a systematic circuit diagram showing a de-emphasis circuit in which backward type and forward type de-emphasis circuits are combined;

DETAILED DESCRIPTION

Figure 1A:
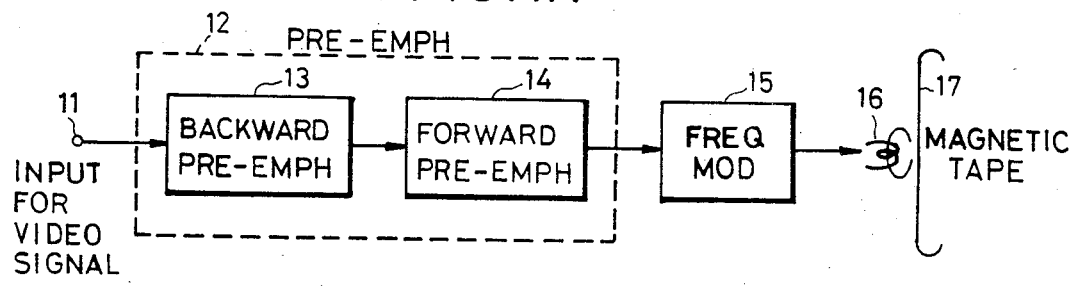
FIGS. 1A and 1B are systematic block diagrams respectively showing an embodiment of a recording system and a reproducing system of a video signal processing system according to the present invention.
Figure 1B:
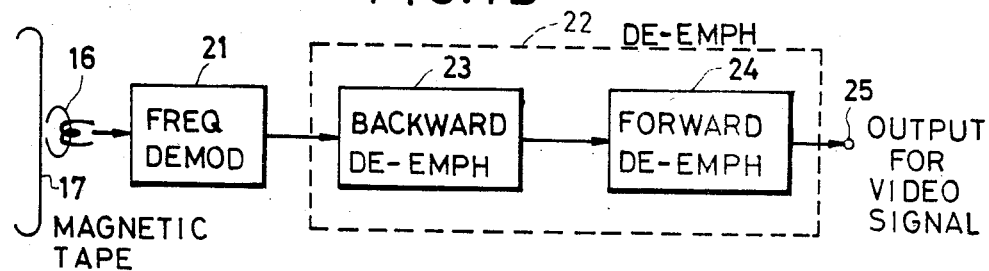

An embodiment of a video signal recording system in the video signal processing circuit according to the present invention is shown in FIG. 1A, and an embodiment of a reproducing system is shown in FIG. 1B. First, in FIG. 1A, a video signal which is to be recorded, is supplied to a pre-emphasis circuit 12 which constitutes an essential part of the system according to the present invention, through an input terminal 11. The video signal supplied to the pre-emphasis circuit 12, is successively supplied to a backward type pre-emphasis circuit 13 and a forward type pre-emphasis circuit 14 which are connected in series and constitute the pre-emphasis circuit 12. The video signal which is emphasized of its high frequency component, is supplied to a frequency modulator 15 wherein the signal frequency modulates a carrier. An output frequency modulated video signal of the frequency modulator 15, is recorded onto a magnetic tape 17 by a magnetic head 16.

In FIG. 1B, the signal which has been recorded onto the magnetic tape 17 in the above described manner, is reproduced by the magnetic head 16. The reproduced signal from the magnetic head 16 is supplied to a frequency demodulator 21 wherein the signal is demodulated. The demodulated video signal is supplied to a de-emphasis circuit 22 which constitutes an essential part of the present invention. The demodulated signal supplied to the de-emphasis circuit 22, is successively supplied to a backward type de-emphasis circuit 23 and a forward type de-emphasis circuit 24 which are connected in series and constitute the de-emphasis circuit 22. The video signal which is suppressed of its high frequency component and restored to its original form, is obtained as a reproduced video signal through an output terminal 25.

Figure 2:
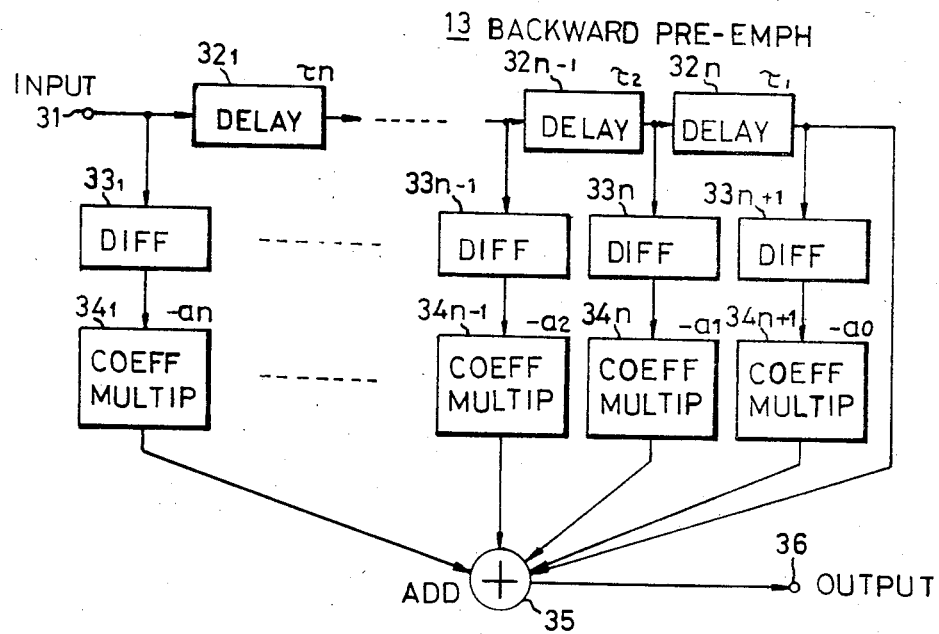
FIG. 2 is a systematic circuit diagram showing an embodiment of a backward type pre-emphasis circuit shown in FIG. 1A.

An embodiment of the backward type pre-emphasis circuit 13 of the pre-emphasis circuit 12 shown in FIG. 1A, is shown in FIG. 2. Delay circuits $32_1$, $32_2$, ..., $32_{n-1}$, and $32_n$ respectively having delay times $\tau_n$, $\tau_{n-1}$, ..., $\tau_2$, and $\tau_1$, are connected in series between an input terminal 31 which is applied with the video signal from the input terminal 11, and an adder 35. Inputs to these delay circuits $32_1$ through $32_n$ are respectively supplied to differentiators $33_1$, $33_2$, ..., and $33_n$. An output of the delay circuit $32_n$ is supplied to a differentiator $33_{n+1}$. Output signals of the differentiators $33_1$ through $33_{n+1}$ are each supplied to the adder 35, through coefficient multipliers $34_1$, $34_2$, ..., $34_n$, and $34_{n+1}$. The coefficient multipliers $34_1$ through $34_{n+1}$ respectively multiply coefficients $-a_n$, $-a_{n-1}$, ..., $-a_2$, $-a_1$, and $-a_0$ to the output signals of the differentiators $33_1$ through $33_{n+1}$, and supplies the multiplied signals to the adder 35. The adder 35 adds these multiplied signals, and the output of the adder 35 which is obtained through an output terminal 36 is supplied to the forward type pre-emphasis circuit 14. The values of the delay times of the delay circuits $32_1$ through $32_n$ may be the same. However, in the present embodiment, the delay times are selected such that a relation $\tau_n > \tau_{n-1} > \ldots > \tau_2 > \tau_1$ stands. Moreover, the coefficients of the coefficient multipliers $34_1$ through $34_{n+1}$ are selected such that a relation $a_0 > a_1 > \ldots > a_{n-1} > a_n$ stands.

In the backward type pre-emphasis circuit 13 which is designed as described heretofore, the high frequency component of the video signal is emphasized relative to the low frequency component in the differentiators $33_1$ through $33_{n+1}$. Further, a predetermined pre-emphasis characteristic is obtained by setting each of the coefficients of the coefficient multipliers $34_1$ through $34_{n+1}$ to predetermined values and performing weighting. It will be assumed that the "present" is an output time when the video signal is obtained from the delay circuit $32_n$ after being delayed by a delay time $(\tau_n + \tau_{n-1} + \ldots + \tau_2 + \tau_1)$. Then, the video signals which will be obtained at times $(\tau_1 + \tau_2 \ldots \tau_{n-1} + \tau_n), \ldots, (\tau_1 + \tau_2)$, and $\tau_1$ subsequent to the present, that is, in the future with respect to the present, are respectively obtained from the input side of the delay circuit $32_1$ and the output sides of the delay circuits $32_1$ through $32_{n-1}$.

Figure 6:
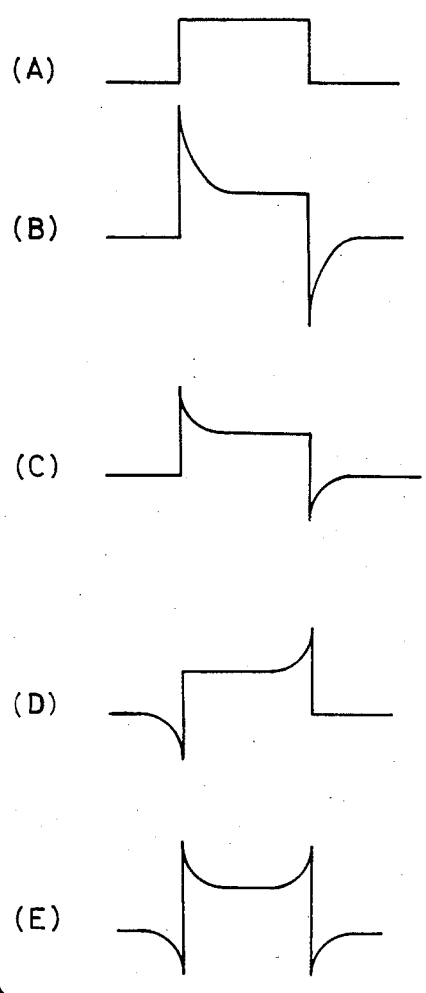
FIGS. 6(A) through 6(E) are graphs for explaining the waveforms of the input and output signals of the pre-emphasis circuit.

When a signal having a waveform shown in FIG. 6(A) is applied to the input terminal 31 of the backward type pre-emphasis circuit 13, a signal having a waveform in which the high frequency component is emphasized as shown in FIG. 6(D) is obtained through the output terminal 36.

Figure 3:
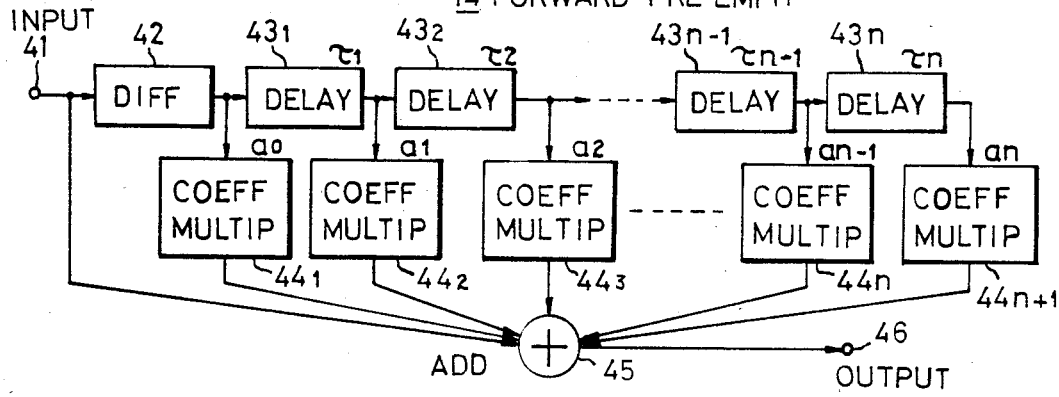
FIG. 3 is a systematic circuit diagram showing an example of a forward type pre-emphasis circuit shown in FIG. 1A.

The signal obtained through the output terminal 36, is applied to an input terminal 41 of an embodiment of the forward type pre-emphasis circuit 14 shown in FIG. 3. The present embodiment of the forward type pre-emphasis circuit 14 is designed as a transversal filter.

The video signal which is applied to the input terminal 41, is directly supplied to an adder 45, and is also supplied to a differentiator 42 wherein the high frequency component of the video signal is emphasized relative to the low frequency component. The output of the differentiator 42 is successively passed through n delay circuits $43_1$ through $43_n$ which respectively have delay times $\tau_1, \tau_2, \ldots,$ and $\tau_n$, and is delayed by a delay time $(\tau_1+\tau_2+ \ldots +\tau_n)$. The output of the delay circuit $43_n$ is supplied to a coefficient multiplier $44_{n+1}$ wherein a coefficient $a_n$ is multiplied to the signal. In addition, each of the outputs of the differentiator 42 and the delay circuits $43_1$ through $43_{n-1}$, are respectively supplied to coefficient multipliers $44_1$ through $44_{n-1}$. These coefficient multipliers $44_1$ through $44_{n-1}$ respectively multiply coefficients $a_0$ through $a_{n-1}$ to the respective inputs, and each of the outputs of these coefficient multipliers $44_1$ through $44_{n-1}$ are supplied to the adder 45. The adder 45 adds the signals supplied thereto, and produces an output through an output terminal 46.

In the forward type pre-emphasis circuit 14 which is designed as described heretofore, the adder 45 adds to the present video signal which is obtained through the input terminal 41, signals which are obtained by weighting each of the differentiated video signals at times $\tau_1, (\tau_1+\tau_2), \ldots, (\tau_1+\tau_2+ \ldots +\tau_n)$ prior to the present, that is, in the past with respect to the present. Thus, a signal which is given a pre-emphasis characteristic, is obtained from the forward type pre-emphasis circuit 14.

The forward type pre-emphasis circuit 14 utilizes the present and past input information, in order to obtain a signal which is given a present pre-emphasis characteristic. Hence, the forward type pre-emphasis circuit 14 carries out a forward type signal processing which is in accordance with the time flow.

When the signal having the waveform shown in FIG. 6(A) is applied to the input terminal 41, a signal having a waveform in which the high frequency component is emphasized as shown in FIG. 6(C) is obtained through the output terminal 46.

Each of the delay times $\tau_n$ through $\tau_1$ of the delay circuits $32_1$ through $32_n$ within the backward type pre-emphasis circuit 13 shown in FIG. 2, are arranged in a reverse sequence to each of the delay times $\tau_1$ through $\tau_n$ of the delay circuits $32_1$ through $43_n$ within the forward type pre-emphasis circuit 14 shown in FIG. 3. Moreover, each of the weighting coefficients $-a_n$ through $-a_0$ of the coefficient multipliers $34_1$ through $34_{n+1}$ within the backward type pre-emphasis circuit 13 are arranged in a reverse sequence to each of the weighting coefficients $a_0$ through $a_n$ of the coefficient multipliers $44_1$ through $44_{n+1}$ within the forward type pre-emphasis circuit 14, and the polarity of each of the weighting coefficients of the coefficient multipliers $34_1$ through $34_{n+1}$ are opposite to the polarity of each of the weighting coefficients of the coefficient multipliers $44_1$ through $44_{n+1}$. Accordingly, with respect to the same input signal waveform, the output signal waveform of the backward type pre-emphasis circuit 13 and the output signal waveform of the forward type pre-emphasis circuit 14 are symmetrical with respect to the time base, as may be seen by comparing FIGS. 6(D) and 6(C). The S/N ratio improvement factors of the backward type pre-emphasis circuit 13 and the forward type pre-emphasis circuit 14, are set to be essentially the same.

Conventionally, a pre-emphasis circuit was constituted solely from a backward type pre-emphasis circuit or a forward type pre-emphasis circuit. For this reason, with respect to an input signal waveform shown in FIG. 6(A), an output signal waveform of the conventional pre-emphasis circuit became as shown in FIG. 6(B). If the degree of pre-emphasis is increased in this conventional pre-emphasis circuit in order to obtain a desired S/N ratio improvement factor, the overshoots in the signal waveform shown in FIG. 6(B) become greater. However, when the overshoots are large, the previously described inversion phenomenon occurs. The pre-emphasized signal was thus passed through a clipping circuit so as to prevent the occurrence of this inversion phenomenon. However, if the overshoots are clipped, the picture quality becomes deteriorated.

On the other hand, according to the system of the present invention, the backward type pre-emphasis circuit 13 and the forward type pre-emphasis circuit 14 are connected in series. Hence, according to this arrangement, the degree of pre-emphasis which is required to obtain the desired S/N ratio improvement factor, may be small compared to the degree of pre-emphasis required in the conventional pre-emphasis circuit constituted solely from a forward type pre-emphasis circuit, for example. In addition, with respect to the same input signal waveform, the positions where the overshoots occur in the output signals of the backward type and forward type pre-emphasis circuits 13 and 14 differ as may be seen from FIGS. 6(D) and 6(C). Accordingly, when the signal having the waveform shown in FIG. 6(A) is applied to the input terminal 31, the output signal waveform of the forward type pre-emphasis circuit 14 which is supplied to the frequency modulator 15, assumes a waveform shown in FIG. 6(E). As may be seen from FIG. 6(E), it is possible to reduce the heights of the overshoots compared to the waveform shown in FIG. 6(B). Therefore, according to the system of the present invention, the inversion phenomenon is unlikely to occur. Moreover, it is unnecessary to clip the overshoots, or, even if the clipping is required, the clipping which is required is exceedingly small compared to the clipping which was required in the conventional pre-emphasis circuit. The picture quality will not become deteriorated by such an exceedingly small clipping.

Figure 4:
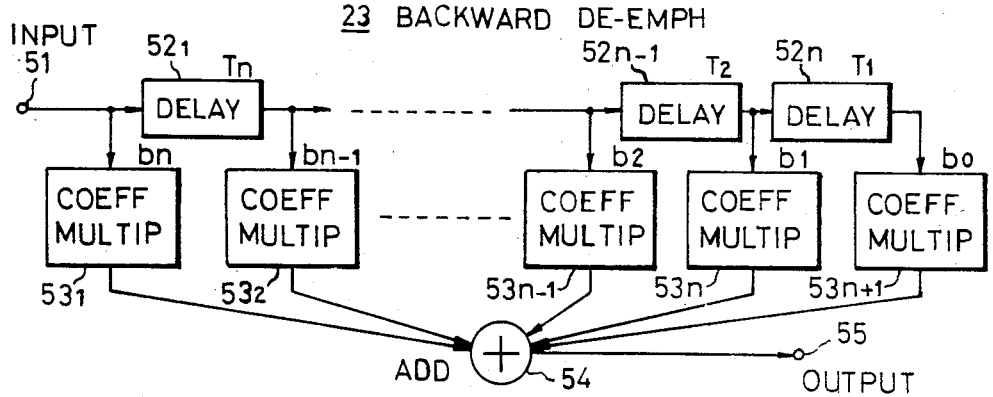
FIG. 4 is a systematic circuit diagram showing an embodiment of a backward type de-emphasis circuit shown in FIG. 1B.
Figure 5:
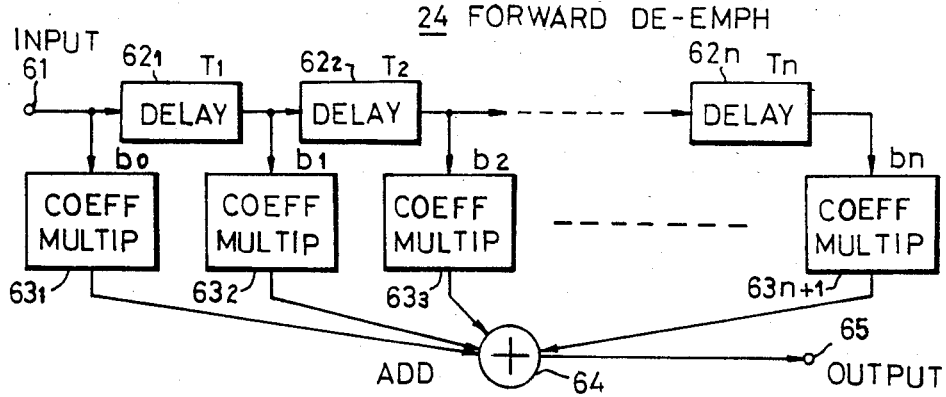
FIG. 5 is a systematic circuit diagram showing an example of a forward type de-emphasis circuit shown in FIG. 1B.

Next, description will be given with respect to the construction of the de-emphasis circuit 22. The demodulated video signal which is obtained from the frequency demodulator 21, is successively supplied to the backward type de-emphasis circuit 23 and the forward type de-emphasis circuit 24. An embodiment of the backward type de-emphasis circuit 23 is shown in FIG. 4, and an embodiment of the forward type de-emphasis circuit 24 is shown in FIG. 5. The de-emphasis circuit 22 gives the signal de-emphasis characteristic which is complementary to the pre-emphasis characteristic given in the pre-emphasis circuit 12. The signal which is given this de-emphasis characteristic, is obtained through the output terminal 25.

The backward type de-emphasis circuit 23 shown in FIG. 4 comprises n delay circuits $52_1$ through $52_n$, coefficient multipliers $53_1$ through $53_{n+1}$, and an adder 54. The delay circuits $52_1$ through $52_n$ respectively have delay times $T_n$ through $T_1$, and are connected in series. The delay circuits $52_1$ through $52_n$ respectively delay the input demodulated video signal which is applied to an input terminal 51. The coefficient multiplier $53_1$ multiplies a weighting coefficient $b_n$ to the input demodulated video signal. The coefficient multipliers $53_2$ through $53_{n+1}$ respectively multiply weighting coefficients $b_{n-1}$ through $b_0$ to the respective outputs of the delay circuits $52_1$ through $52_n$. The outputs of the coefficient multipliers $53_1$ through $53_{n+1}$ are added in the adder 54, and the added output is produced through an output terminal 55.

Figure 7:
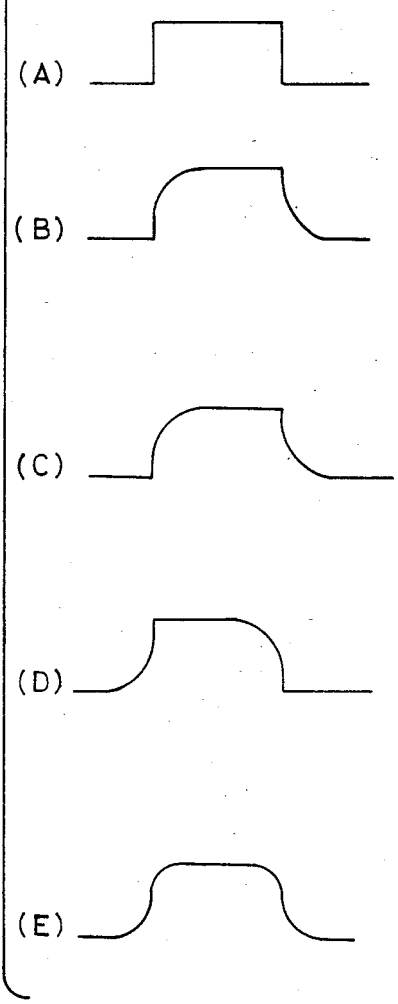
FIGS. 7(A) through 7(E) are graphs for explaining the waveforms of the input and output signals of the de-emphasis circuit.

It will be assumed that a reference time is a time when the output signal of the coefficient multiplier $53_{n+1}$ is obtained. Then, the backward type de-emphasis circuit 23 is a circuit which performs weighting with respect to video signals at times $T_1$, $(T_1+T_2)$, ..., and $(T_1+T_2+ \ldots +T_n)$ subsequent to this reference time, that is, in the future with respect to the reference time, and adds the weighted video signals with the video signal at the reference time which is obtained from the coefficient multiplier $53_{n+1}$. Accordingly, as in the case of the backward type pre-emphasis circuit 13 described before, the backward type de-emphasis circuit 23 utilizes the future information which will be obtained subsequent to the present, and carries out a signal processing which is counter to the time flow. Thus, when a signal having a waveform shown in FIG. 7(A) is applied to the input terminal 51, a signal having a waveform shown in FIG. 7(D) is obtained through the output terminal 55 of the de-enphasis circuit 23 shown in FIG. 4. On the other hand, if the same signal shown in FIG. 7(A) is applied to a conventional de-emphasis circuit constituted solely from a forward type de-emphasis circuit, the output signal will assume a waveform shown in FIG. 7(B). The coefficients of the coefficient multipliers $53_1$ through $53_{n+1}$ are selected such that a relation $b_n<b_{n-1}< \ldots <b_1<b_0$ stands. Moreover, the values of the delay times of the delay circuits $52_1$-$52_n$ may be the same. However, in the present embodiment, the delay times are selected such that a relation $T_1<T_2< \ldots <T_{n-1}<T_n$ stands.

The forward type de-emphasis circuit 24 shown in FIG. 5 is designed as a transversal filter, and comprises n delay circuits $62_1$ through $62_n$, coefficient multipliers $63_1$ through $63_{n+1}$, and an adder 64. The n delay circuits $62_1$ through $62_n$ respectively have delay times $T_1$ through $T_n$, and are connected in series. The delay circuits $62_1$ through $62_n$ respectively delay the input signal which is applied to an input terminal 61. The coefficient multiplier $63_1$ multiplies a weighting coefficient $b_0$ to the input signal. The coefficient multipliers $63_2$ through $63_{n+1}$ respectively multiply weighting coefficients $b_1$ through $b_n$ to the respective outputs of the delay circuits $62_1$ through $62_n$. The outputs of the coefficient multipliers $63_1$ through $63_{n+1}$ are added in the adder 64, and the added output is produced through an output terminal 65. As in the case of the forward type pre-emphasis circuit 14 described before in conjunction with FIG. 3, the forward type de-emphasis circuit 24 utilizes the present and past input information in order to obtain the present output waveform, and carries out a signal processing which is in accordance with the time flow.

Each of the delay times $T_1$ through $T_n$ of the delay circuits $62_1$ through $62_n$ within the forward type de-emphasis circuit 24, are arranged in a reverse sequence to each of the delay times $T_n$ through $T_1$ of the delay circuits $52_1$ through $53_n$ within the backward type de-emphasis circuit 23. Moreover, each of the weighting coefficients $b_0$ through $b_n$ of the coefficient multipliers $64_1$ through $64_{n+1}$ within the forward type de-emphasis circuit 24 are arranged in a reverse sequence to each of the weighting coefficients $b_n$ through $b_0$ of the coefficient multipliers $54_1$ through $54_{n+1}$ within the backward type de-emphasis circuit 23. Accordingly, with respect to the same input signal waveform, the output signal waveform of the forward type de-emphasis circuit 24 and the output signal waveform of the backward type de-emphasis circuit 23 are symmetrical with respect to the time base. As a result, when the signal having the waveform shown in FIG. 7(A) is applied to the input terminal 61, a signal having a waveform shown in FIG. 7(C) which is complementary to the waveform shown in FIG. 7(D), is obtained through the output terminal 65. Thus, when the square wave signal shown in FIG. 7(A) is applied to the de-emphasis circuit 22 comprising the backward type de-emphasis circuit 23 and the forward type de-emphasis circuit 24, a de-emphasized signal having a waveform shown in FIG. 7(E) is produced from the de-emphasis circuit 22. As may be seen from FIG. 7(E), the high frequency component of the signal is suppressed. Therefore, the signal which is pre-emphasized as shown in FIG. 6(E) in the recording system, is de-emphasized in the de-emphasis circuits 23 and 24 and restored to the square wave signal shown in FIG. 6(A) or FIG. 7(A).

Figure 8:
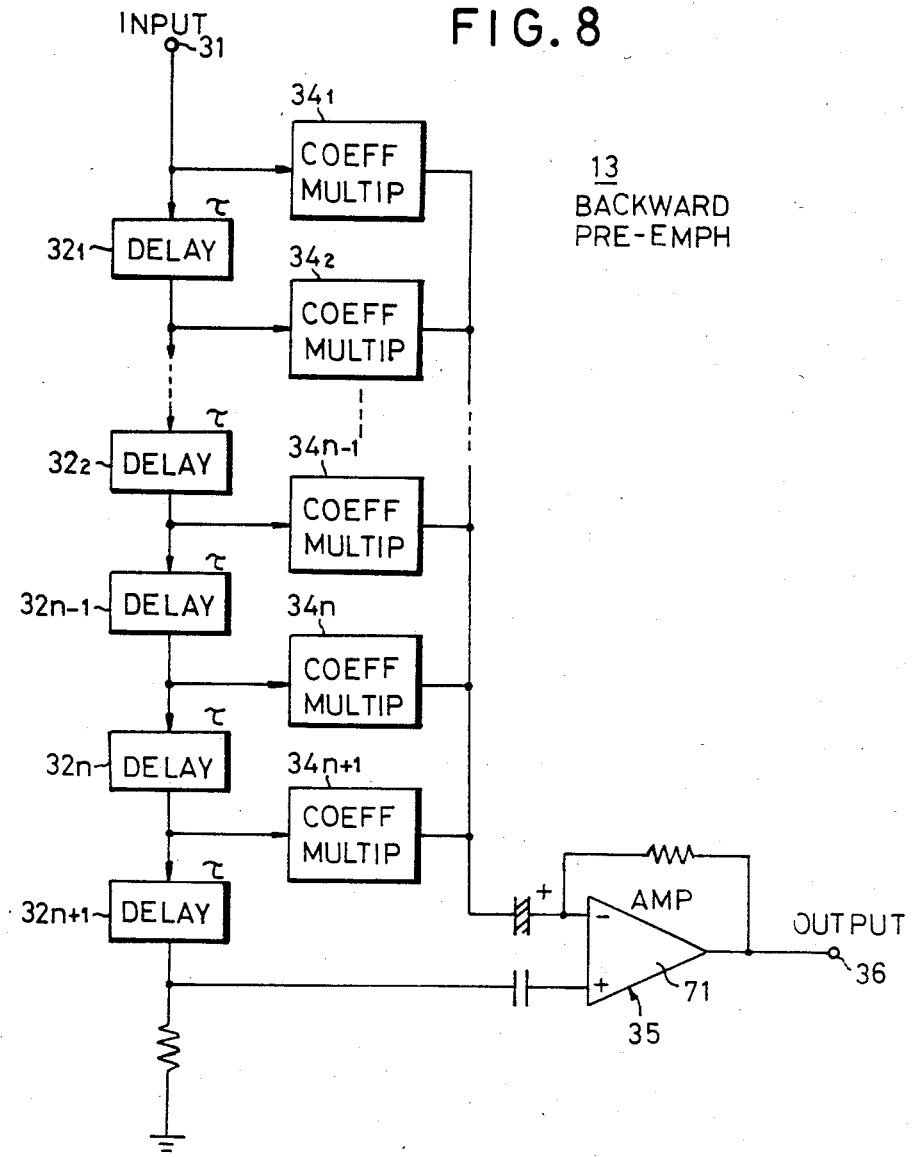
FIG. 8 is a concrete systematic circuit diagram showing a modification of the backward type pre-emphasis circuit shown in FIG. 2.

In the backward type pre-emphasis circuit 13 shown in FIG. 2, the differentiators $33_1$ through $33_{n+1}$ may be omitted. A concrete circuit diagram of the backward type pre-emphasis circuit 13 in which the differentiators are omitted, is shown in FIG. 8. In FIG. 8, those parts which are the same as those corresponding parts in FIG. 2 are designated by the same reference numerals. The outputs of the coefficient multipliers $34_1$ through $34_{n+1}$ are supplied to an inverting input terminal of an operational amplifier 71 which constitutes the adder 35. The output of the delay circuit $32_n$ is supplied to the coefficient multiplier $34_{n+1}$, and is also supplied to a non-inverting input terminal of the operational amplifier 71 through a delay circuit $32_{n+1}$. The output of the operational amplifier 71 is connected to its inverting input terminal through a resistor. The output signal of the operational amplifier 71 is obtained through the output terminal 36 as the output signal of the backward type pre-emphasis circuit 13. In this embodiment, each of the delay circuits $32_1$-$32_{n+1}$ has the same delay time $\tau$ (for example, 0.13 $\mu$sec).

Figure 9:
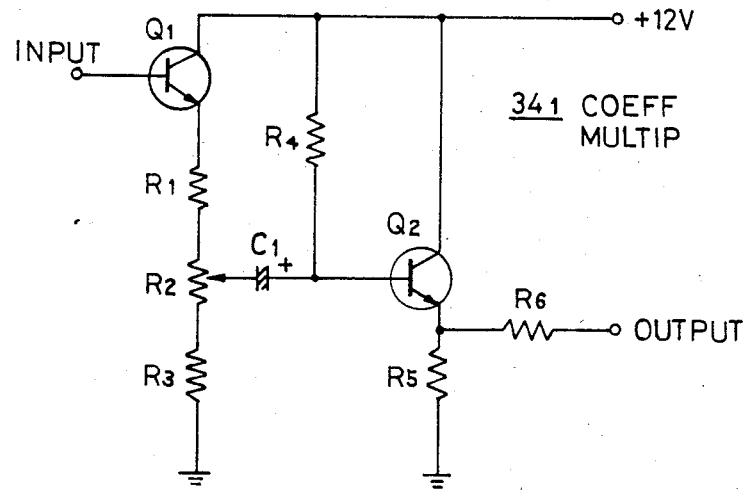
FIG. 9 is a concrete circuit diagram showing an embodiment of a coefficient multiplier within the circuit system shown in FIG. 8.

A concrete circuit diagram of the coefficient multiplier $34_1$ is shown in FIG. 9. The coefficient multiplier $34_1$ comprises transistors Q1 and Q2, resistors R1 through R6, and a capacitor C1 which are connected as shown in FIG. 9. The other coefficient multipliers $34_2$ through $34_{n+1}$ are constructed similarly. The coefficient multipliers $34_1$ through $34_{n+1}$ are set to have different coefficients, by appropriately selecting the resistance of the variable resistor R2.

Figure 10:
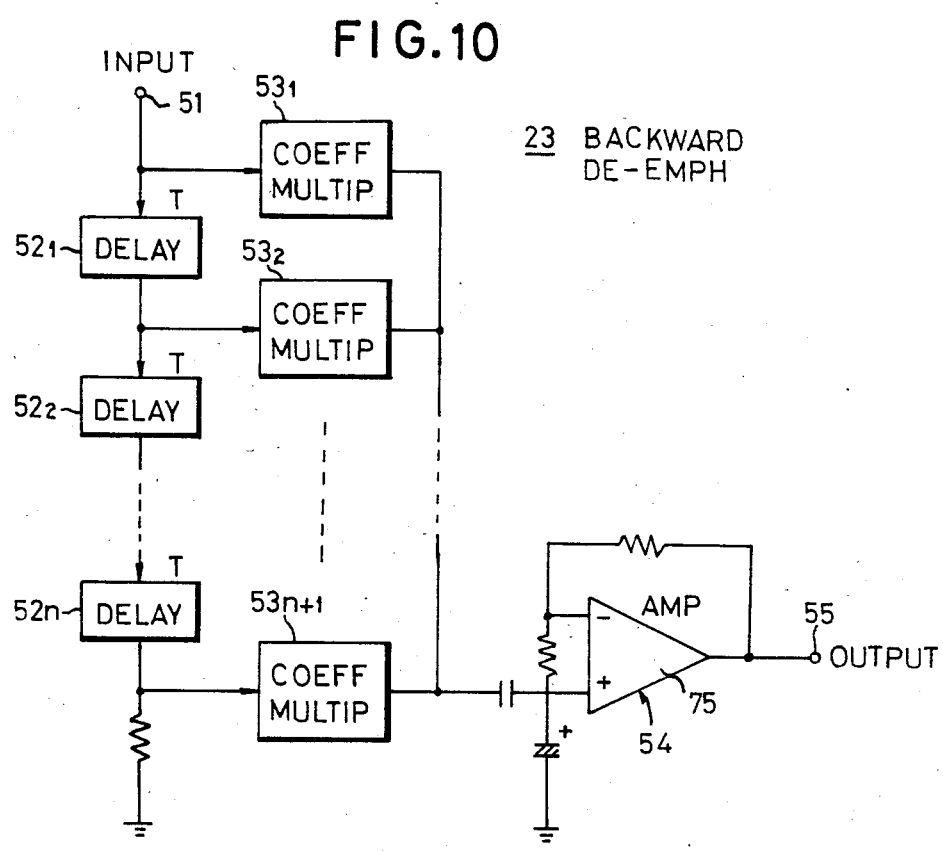
FIG. 10 is a concrete systematic circuit diagram showing the backward type de-emphasis circuit shown in FIG. 3.

A concrete circuit diagram of the backward type de-emphasis circuit 23 shown in FIG. 4, is shown in FIG. 10. In FIG. 10, those parts which are the same as those corresponding parts in FIG. 4 are designed by the same reference numerals. The output signals of the coefficient multipliers $53_1$ through $53_{n+1}$ are supplied to a non-inverting input terminal of an operational amplifier 75 which constitutes the adder 54. The output of the operational amplifier 75 is connected to its inverting input terminal through a resistor. This inverting input terminal of the operational amplifier 75 is grounded through another resistor and a capacitor which are connected in series. The output signal of the operational amplifier 75 is obtained through the output terminal 55 as the output signal of the backward type de-emphasis circuit 23. In the present embodiment, each of the delay circuits $52_1$ through $52_n$ has the same delay time T. This delay time T may be the same as the delay time $\tau$ in the pre-emphasis circuit. The coefficient multipliers $53_1$ through $53_{n+1}$ may also be constructed as shown in FIG. 9.

In the embodiment described previously, the pre-emphasis circuit comprises the backward type pre-emphasis circuit 13 and the forward type pre-emphasis circuit 14 which are independent, and connected in series. Similarly, the de-emphasis circuit comprises the backward type de-emphasis circuit 23 and the forward type de-emphasis circuit 24 which are independent, and connected in series. However, the backward type and forward type circuits may be integrally connected as shown in FIGS. 11 and 12.

FIG. 11 shows a pre-emphasis circuit 12A as another embodiment of the pre-emphasis circuit 12. In FIG. 11, those parts which are the same as those corresponding parts in FIGS. 2 and 3 are designed by the same reference numerals, and their description will be omitted. According to the present embodiment, the pre-emphasis circuit corresponds to a circuit in which the backward type pre-emphasis circuit 13 shown in FIG. 2 and the forward type pre-emphasis circuit 14 shown in FIG. 3 are integrally connected. The output of the delay circuit $32_n$ is supplied to the differentiator $33_{n+1}$, and is also supplied to an adder 81 and the differentiator 42. The adder 81 is commonly used as the adders 35 and 45 shown in FIGS. 2 and 3. The outputs of the coefficient multipliers $34_1$ through $34_{n+1}$, the delay circuit $32_n$, and the coefficient multipliers $44_1$ through $44_{n+1}$ are respectively supplied to the adder 81 wherein these outputs are added. The pre-emphasized output signal of the adder 81 is obtained through the output terminal 46. Accordingly, when the signal having the waveform shown in FIG. 6(A) is supplied to the input terminal 31, the signal having the waveform shown in FIG. 6(E) is obtained through the output terminal 46. In the present embodiment, the differentiators $33_1$ through $33_{n+1}$ may also be omitted.

FIG. 12 shows a de-emphasis circuit 22A as another embodiment of the de-emphasis circuit 22. In FIG. 12, those parts which are the same as those corresponding parts in FIGS. 4 and 5 are designed by the same reference numerals, and their description will be omitted. According to the present embodiment, the de-emphasis circuit corresponds to a circuit in which the backward type de-emphasis circuit 23 shown in FIG. 4 and the forward type de-emphasis circuit 24 shown in FIG. 5 are integrally connected. The output of the delay circuit $52_n$ is supplied to an adder 92 through a coefficient multiplier 91 which multiplies a coefficient $b_0$. The output of the delay circuit $52_n$ is also supplied to the delay circuit $62_1$. The coefficient multiplier 91 is commonly used as the coefficient multipliers $53_{n+1}$ and $63_1$ shown in FIGS. 4 and 5. In addition, the adder 92 is commonly used as the adders 54 and 64 shown in FIGS. 4 and 5. The outputs of the coefficient multipliers $53_1$ through $53_n$, 91, and $63_2$ through $63_{n+1}$ are respectively supplied to the adder 92 wherein these outputs are added. The de-emphasized output signal of the adder 92 is obtained through the output terminal 65. Accordingly, when the signal having the waveform shown in FIG. 7(A) is supplied to the input terminal 51, the signal having the waveform shown in FIG. 7(E) is obtained through the output terminal 65. When the signal having the waveform shown in FIG. 6(E) is supplied to the input terminal 51, the signal having the waveform shown in FIG. 6(A) (or FIG. 7(A)) is obtained through the output terminal 65.

In each of the embodiments described heretofore, the forward type pre-emphasis circuit 14 is connected in series at a stage subsequent to the backward type pre-emphasis circuit 13. However, the connection may be in reverse, that is, the forward type pre-emphasis circuit 14 may be connected in series at a stage prior to the backward type pre-emphasis circuit 13. Similarly, the forward type de-emphasis circuit 24 may be connected in series at a stage prior to the backward type de-emphasis circuit 23. In other words, the backward type and forward type circuits may be connected in series in either sequence.

Further, in the embodiments described before, the forward type pre-emphasis circuit 14 and the forward type de-emphasis circuit 24 are each designed as a transversal filter. However, the circuits 14 and 24 are not limited to the transversal filter, and other conventional circuits may be utilized. For example, the forward type pre-emphasis circuit 14 may be designed as a highpass filter comprising a capacitor and resistors, and the forward type de-emphasis circuit 24 may be designed as a lag-lead filter comprising a capacitor and resistors. Moreover, memories may be used instead of these filters, to obtain similar characteristics.

In addition, the backward type pre-emphasis circuit 14 and the backward type de-emphasis circuit 23 may respectively be designed in the form of an adapter. In this case, such an adapter is connected to a recording and reproducing apparatus which already has a built-in forward type pre-emphasis circuit and a forward type de-emphasis circuit.

Figure 13:
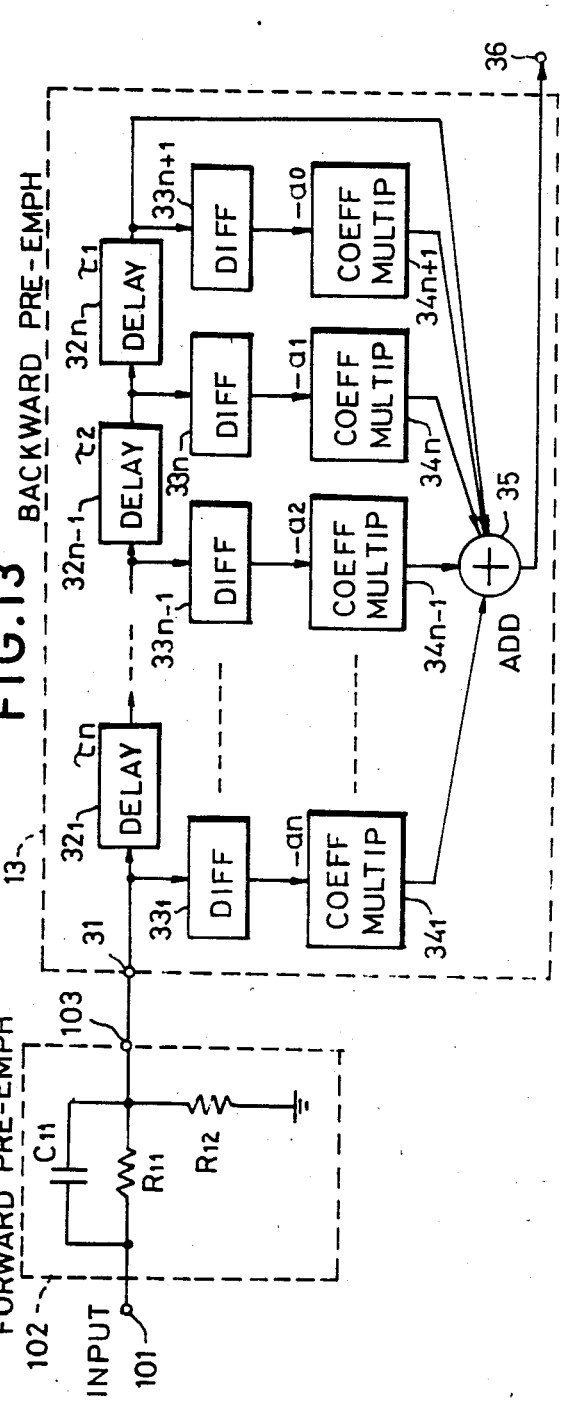
FIG. 13 is a systematic circuit diagram showing another embodiment of a pre-emphasis circuit.

FIG. 13 shows another embodiment of the pre-emphasis circuit. In FIG. 13, a forward type pre-emphasis circuit 102 comprises a capacitor C11 and resistors R11 and R12, and is of a known construction. The recording video signal from the input terminal 11 in FIG. 1A is applied to an input terminal 101. The input terminal 31 of the backward type pre-emphasis circuit 13 is connected to an output terminal 103.

Figure 14:
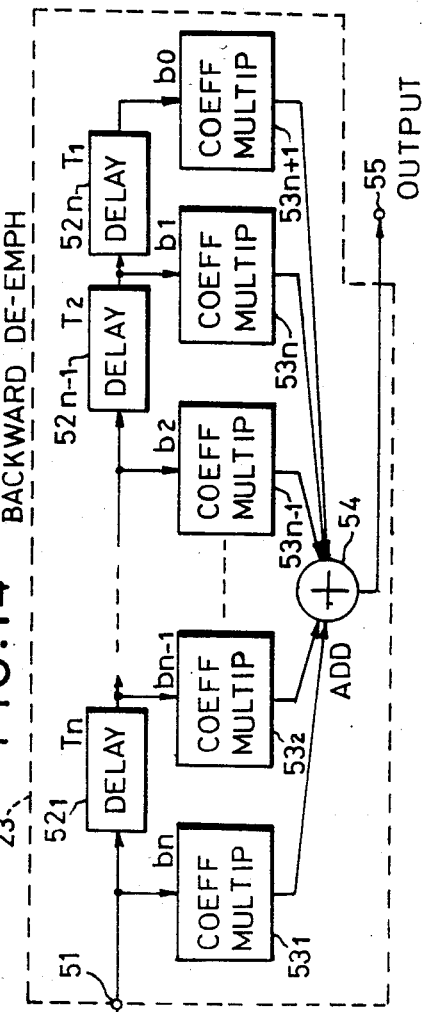
FIG. 14 is a systematic circuit diagram showing another embodiment of a de-emphasis circuit.

FIG. 14 shows another embodiment of the de-emphasis circuit. In FIG. 14, a forward type de-emphasis circuit 112 comprises a capacitor C12 and a resistor R13, and is of a known construction. The output signal of the frequency demodulator 21 shown in FIG. 1B is supplied to an input terminal 111. The input terminal 51 of the backward type de-emphasis circuit 23 is connected to an output terminal 113.

According to the pre-emphasis circuit shown in FIG. 13 and the de-emphasis circuit shown in FIG. 14, it is also possible to similarly obtain the same desired pre-emphasis characteristic and de-emphasis characteristic, as in the embodiments described previously.

Further, the present invention is not limited to these embodiments, and various variations and modifications may be made without departing from the scope of the present invention.

What is claimed is:

1. A video signal processing system for application in a recording and reproducing system which records a video signal onto a recording medium and reproduces the recorded video signal from the recording medium, said video signal processing system comprising:

pre-emphasis means for emphasizing a high frequency component of a recording video signal which is to be recorded relative to a low frequency component of the recording video signal; and de-emphasis means for suppressing a high frequency component of a reproduced video signal which is reproduced from said recording medium relative to a low frequency component of the reproduced video signal, said pre-emphasis means comprising a forward type pre-emphasis circuit for weighting a past input video signal which was supplied to said forward type pre-emphasis circuit at a past time relative to an input time when an input video signal is being supplied thereto, and for producing an output video signal by adding the weighted past input video signal to the input video signal which is being supplied, and a backward type pre-emphasis circuit for weighting a future input video signal which was supplied to said backward type pre-emphasis circuit at a subsequent time relative to an output time when an output video signal is being produced, and for producing the output video signal by adding said weighted future input video signal to the video signal of the output time, said de-emphasis means comprising a forward type de-emphasis circuit for weighting a past input video signal which was supplied to said forward type de-emphasis circuit at a past time relative to an input time when an input video signal is being supplied thereto, and for producing an output video signal by adding the weighted input video signal to the input video signal which is being supplied, and a backward type de-emphasis circuit for weighting a future input video signal which was supplied to said backward type de-emphasis circuit at a subsequent time relative to an output time when an output video signal is being produced, and for producing the output video signal by adding the weighted future input video signal to the video signal of the output time.

2. A video signal processing system as claimed in claim 1 in which said backward type pre-emphasis circuit comprises a first plurality of series connected delay circuits for successively delaying an input video signal of said backward type pre-emphasis circuit, a first plurality of coefficient multipliers each supplied with an input signal of each of said first plurality of delay circuits, for multiplying a weighting coefficient to each of the input signals of said first plurality of delay circuits, and a first adder for adding each of output signals of said first plurality of coefficient multipliers and an output signal of a delay circuit which is provided in a final stage of said first plurality of delay circuits to produce the output video signal, and said backward type de-emphasis circuit comprises a second plurality of series connected delay circuits for successively delaying an input video signal of said backward type de-emphasis circuit, a second plurality of coefficient multipliers each supplied with an input signal of each of said first plurality of delay circuits and with an output signal of a delay circuit which is provided at a final stage of said second plurality of delay circuits, for multiplying a weighting coefficient to each of the input signals of said second plurality of delay circuits and the output signal of the delay circuit provided at the final stage of said second plurality of delay circuits, and a second adder for adding each of output signals of said second plurality of coefficient multipliers to produce the output video signal.

3. A video signal processing system as claimed in claim 2 in which said backward type pre-emphasis circuit further comprises a first plurality of differentiators each supplied with each of the input signals of said first plurality of delay circuits and with the output signal of the delay circuit provided at the final stage of said first plurality of delay circuits, for differentiating each of the input signals of said first plurality of delay circuits and the output signal of the delay circuit provided in the final stage of said first plurality of delay circuits, said first plurality of coefficient multipliers being connected in correspondence with said first plurality of differentiators such that each of said first plurality of coefficient multipliers is supplied with an output signal of a corresponding differentiator among said first plurality of differentiators.

4. A video signal processing system as claimed in claim 2 in which delay times of said first plurality of delay circuits in said backward type pre-emphasis circuit are selected such that a delay circuit which is provided at a former stage of said first plurality of delay circuits has a large delay time and the delay circuit which is provided at a latter stage of said first plurality of delay circuits has a small delay time, and delay times of said second plurality of delay circuits in said backward type de-emphasis circuit are selected such that a delay circuit which is provided at a former stage of said second plurality of delay circuits has a large delay time and the delay circuit which is provided at a latter stage of said second plurality of delay circuits has a small delay time.

5. A video signal processing system as claimed in claim 2 in which weighting coefficients of said first plurality of coefficient multipliers in said backward type pre-emphasis circuit are selected such that a coefficient multiplier which is provided at a former stage of said first plurality of coefficient multipliers has a negative coefficient with a small absolute value and a coefficient multiplier which is provided at a latter stage of said first plurality of coefficient multipliers has a negative coefficient with a large absolute value, and weighting coefficients of said second plurality of coefficient multipliers in said backward type de-emphasis circuit are selected such that a coefficient multiplier which is provided at a former stage of said second plurality of coefficient multipliers has a small coefficient and a coefficient multiplier which is provided at a latter stage of said second plurality of coefficient multipliers has a large coefficient.

6. A video signal processing system as claimed in claim 2 in which said forward type pre-emphasis circuit comprises a third plurality of series connected delay circuits for successively delaying said input video signal of said forward type pre-emphasis circuit, a differentiator for differentiating said input video signal of said forward type pre-emphasis circuit and supplying a differentiated video signal to a delay circuit which is provided at an initial stage of said third plurality of delay circuits, a third plurality of coefficient multipliers each supplied with an input signal of each of said third plurality of delay circuits, for multiplying a weighting coefficient to each of the input signals of said third plurality of delay circuits, and a third adder for adding said input video signal of said forward type pre-emphasis circuit and each of output signals of said third plurality of coefficient multipliers to produce the output video signal, said backward type pre-emphasis circuit and said forward type pre-emphasis circuit being connected in series, and said forward type de-emphasis circuit comprises a fourth plurality of series connected delay circuits for successively delaying said input video signal of said forward type de-emphasis circuit, a fourth plurality of coefficient multipliers each supplied with an input signal of each of said fourth plurality of delay circuits and with an output signal of a delay circuit which is provided at a final stage of said fourth plurality of delay circuits, for multiplying a weighting coefficient to each of the input signals of said fourth plurality of delay circuits and the output signal of the delay circuit provided at the final stage of said fourth plurality of delay circuits, and a fourth adder for adding each of output signals of said fourth plurality of coefficient multipliers to produce the output video signal of said forward type de-emphasis circuit, said backward type de-emphasis circuit and said forward type de-emphasis circuit being connected in series.

7. A video signal processing system as claimed in claim 6 in which delay times of said first plurality of delay circuits in said backward type pre-emphasis circuit are selected such that a delay circuit which is provided at a former stage of said first plurality of delay circuits has a large delay time and the delay circuit which is provided at a latter stage of said first plurality of delay circuits has a small delay time, and delay times of said third plurality of delay circuits in said forward type pre-emphasis circuit are selected such that the delay circuit which is provided at a former stage of said third plurality of delay circuits has a small delay time and a delay circuit which is provided at a latter stage of said third plurality of delay circuits has a large delay time.

8. A video signal processing system as claimed in claim 7 in which a sequence with which the delay times of the series connected first plurality of delay circuits are set from the initial stage to the final stage of said first plurality of delay circuits, is in a reverse relation to a sequence with which the delay times of the series connected third plurality of delay circuits are set from the initial stage to the final stage of said third plurality of delay circuits.

9. A video signal processing system as claimed in claim 6 in which weighting coefficients of said first plurality of coefficient multipliers in said backward type pre-emphasis circuit are selected such that a coefficient multiplier which is provided at a former stage of said first plurality of coefficient multipliers has a negative coefficient with a small absolute value and a coefficient multiplier which is provided at a latter stage of said first plurality of coefficient multipliers has a negative coefficient with a large absolute value, and weighting coefficients of said third plurality of coefficient multipliers in said forward type pre-emphasis circuit are selected such that a coefficient multiplier which is provided at a former stage of said third plurality of coefficient multipliers has a large coefficient and a coefficient multiplier which is provided at a latter stage of said third plurality of coefficient multipliers has a small coefficient.

10. A video signal processing system as claimed in claim 9 in which a sequence with which the absolute values of coefficients of said first plurality of coefficient multipliers are set from the initial stage to the final stage of said first plurality of coefficient multipliers, is in a reverse relation to a sequence with which the coefficients of said third plurality of coefficient multipliers are set from the initial stage to the final stage of said third plurality of coefficient multipliers.

11. A video signal processing system as claimed in claim 6 in which delay times of said second plurality of delay circuits in said backward type de-emphasis circuit are selected such that a delay circuit which is provided at a former said second plurality of delay circuits has a large delay time and the delay circuit which is provided at a latter stage of said second plurality of delay circuits has a small delay time, and delay times of said fourth plurality of delay circuits in said forward type de-emphasis circuit are selected such that the delay circuit which is provided at a former stage of said fourth plurality of delay circuits has a small delay time and the delay circuit which is provided at a latter stage of said fourth plurality of delay circuits has a large delay time.

12. A video signal processing system as claimed in claim 11 in which a sequence with which the delay times of the series connected second plurality of delay circuits are set from the initial stage to the final stage of said second plurality of delay circuits, is in a reverse relation to a sequence with which the delay times of the series connected fourth plurality of delay circuits are set from the initial stage to the final stage of said fourth plurality of delay circuits.

13. A video signal processing system as claimed in claim 6 in which weighting coefficients of said second plurality of coefficient multipliers in said backward type de-emphasis circuit are selected such that a coefficient multiplier which is provided at a former stage of said second plurality of coefficient multipliers has a small coefficient and a coefficient multiplier which is provided at a latter stage of said second plurality of coefficient multipliers has a large coefficient, and weighting coefficients of said fourth plurality of coefficient multipliers in said forward type de-emphasis circuit are selected such that a coefficient multiplier which is provided at a former stage of said fourth plurality of coefficient multipliers has a large coefficient and a coefficient multiplier which is provided at a latter stage of said fourth plurality of coefficient multipliers has a small coefficient.

14. A video signal processing system as claimed in claim 13 in which a sequence with which the coefficients of said second plurality of coefficient multipliers are set from the initial stage to the final stage of said second plurality of coefficient multipliers, is in a reverse relation to a sequence with which the coefficients of said fourth plurality of coefficient multipliers are set from the initial stage to the final stage of said fourth plurality of coefficient multipliers.

15. A video signal processing system as claimed in claim 6 in which said first and third adders are constituted by a single adder for commonly operating said first and third adders, and said second and fourth adders are constituted by another single adder for commonly operating said second and fourth adders.

16. A video signal processing system as claimed in claim 2 in which said forward type pre-emphasis circuit comprises a highpass filter which is constituted from a capacitor and resistors, said forward type pre-emphasis circuit and said backward type pre-emphasis circuit are connected in series, said forward type de-emphasis circuit comprises a lowpass filter which is constituted from resistors and a capacitor, and said forward type de-emphasis circuit and said backward type de-emphasis circuit are connected in series.

* * * * *